(12) United States Patent
Zhang et al.

(10) Patent No.: US 11,889,496 B2
(45) Date of Patent: Jan. 30, 2024

(54) ACTIVATION OF MULTIPLE CONFIGURATIONS

(71) Applicant: QUALCOMM Incorporated, San Diego, CA (US)

(72) Inventors: Qian Zhang, Basking Ridge, NJ (US); Yan Zhou, San Diego, CA (US); Jelena Damnjanovic, Del Mar, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 17/338,041

(22) Filed: Jun. 3, 2021

(65) Prior Publication Data
US 2022/0394731 A1    Dec. 8, 2022

(51) Int. Cl.
| | |
|---|---|
| *H04W 72/1263* | (2023.01) |
| *H04L 1/1607* | (2023.01) |
| *H04W 72/0446* | (2023.01) |
| *H04W 72/23* | (2023.01) |
| *H04W 72/50* | (2023.01) |

(52) U.S. Cl.
CPC ....... *H04W 72/1263* (2013.01); *H04L 1/1614* (2013.01); *H04W 72/0446* (2013.01); *H04W 72/23* (2023.01); *H04W 72/535* (2023.01)

(58) Field of Classification Search
CPC ........... H04W 72/1263; H04W 72/535; H04W 72/23; H04W 72/0446; H04L 1/1614
See application file for complete search history.

(56) References Cited

U.S. PATENT DOCUMENTS

| | | | | |
|---|---|---|---|---|
| 10,694,569 | B2* | 6/2020 | Jin | H04L 1/08 |
| 11,218,869 | B2* | 1/2022 | Kim | H04L 5/0007 |
| 11,785,615 | B2* | 10/2023 | Babaei | H04W 72/23 |
| | | | | 370/329 |
| 2014/0056243 | A1* | 2/2014 | Pelletier | H04W 16/32 |
| | | | | 370/329 |
| 2018/0014284 | A1* | 1/2018 | Yi | H04L 5/0048 |
| 2018/0048994 | A1* | 2/2018 | Kwon | H04W 4/021 |
| 2018/0139734 | A1* | 5/2018 | Babaei | H04W 72/23 |
| 2019/0014564 | A1* | 1/2019 | Lee | H04W 72/121 |

(Continued)

FOREIGN PATENT DOCUMENTS

| | | | | |
|---|---|---|---|---|
| WO | WO-2018031816 | A1 * | 2/2018 | ........ H04W 36/0033 |
| WO | WO-2021066117 | A1 * | 4/2021 | ........... H04L 1/0061 |

*Primary Examiner* — Jael M Ulysse
(74) *Attorney, Agent, or Firm* — Patterson + Sheridan, LLP

(57) ABSTRACT

Aspects of the present disclosure relate to wireless communications, and more particularly, to techniques for activation of configurations. Certain aspects provide a method for wireless communication by a first wireless node. The method generally includes receiving multiple configurations allocating resources for communication with one or more second wireless nodes, each of the multiple configurations being mapped to a configuration identifier; and receiving a message including the configuration identifier mapped to at least two of the multiple configurations, the message activating the at least two of the multiple configuration for the communication with the one or more second wireless nodes. The method may also include communicating with the one or more second wireless nodes using the at least two of the multiple configurations activated via the message.

30 Claims, 13 Drawing Sheets

(56) References Cited

U.S. PATENT DOCUMENTS

| | | | |
|---|---|---|---|
| 2019/0089436 A1* | 3/2019 | Wei | H04L 1/16 |
| 2020/0068595 A1* | 2/2020 | Dinan | H04W 4/70 |
| 2020/0153560 A1* | 5/2020 | Park | H04L 1/1822 |
| 2021/0036822 A1* | 2/2021 | Lyu | H04L 5/0048 |
| 2022/0053522 A1* | 2/2022 | MolavianJazi | H04W 72/1263 |
| 2022/0061074 A1* | 2/2022 | Babaei | H04L 5/0053 |
| 2022/0124678 A1* | 4/2022 | Lee | H04W 72/23 |
| 2022/0149997 A1* | 5/2022 | Wang | H04L 1/1864 |
| 2022/0232612 A1* | 7/2022 | Bai | H04L 5/0096 |
| 2022/0330213 A1* | 10/2022 | Lee | H04L 5/0055 |
| 2022/0369341 A1* | 11/2022 | Ying | H04W 76/30 |

* cited by examiner

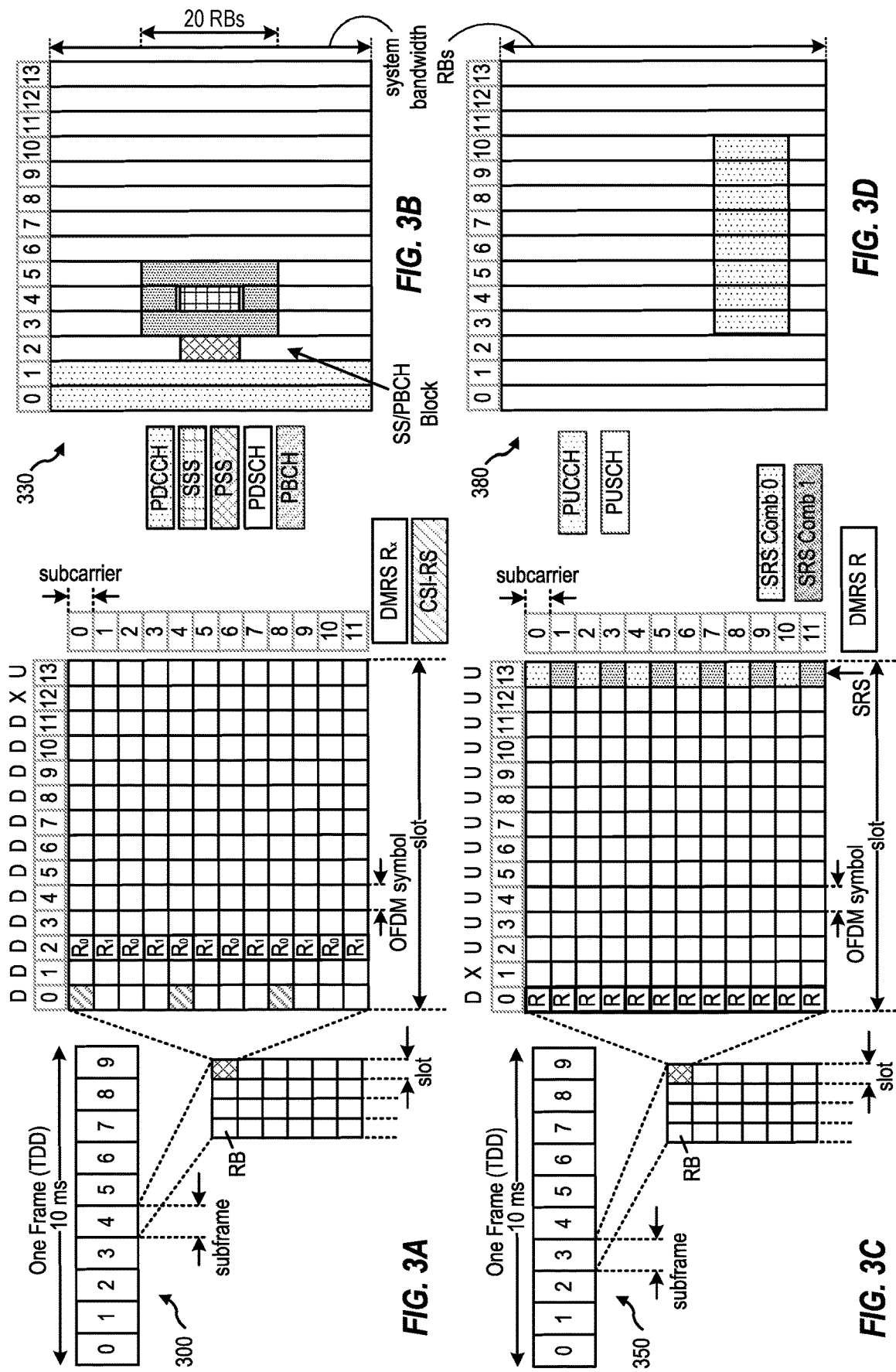

ACTIVATION OF MULTIPLE CONFIGURATIONS

INTRODUCTION

Aspects of the present disclosure relate to wireless communications, and more particularly, to techniques for activation of configurations.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects provide a method for wireless communication by a first wireless node. The method generally includes: receiving multiple configurations allocating resources for communication with one or more second wireless nodes, each of the multiple configurations being mapped to a configuration identifier; receiving a message including the configuration identifier mapped to at least two of the multiple configurations, the message activating the at least two of the multiple configuration for the communication with the one or more second wireless nodes; and communicating with the one or more second wireless nodes using the at least two of the multiple configurations activated via the message.

Certain aspects provide a method for wireless communication by a first wireless node. The method generally includes transmitting multiple configurations allocating resources for communication with a second wireless node, each of the multiple configurations being mapped to a configuration identifier; transmitting a message including the configuration identifier mapped to at least two of the multiple configurations, the message activating the at least two of the multiple configuration for the communication with the one or more second wireless nodes; and communicating with the second wireless node using the at least two of the multiple configurations activated via the message.

Certain aspects provide a non-transitory computer-readable medium comprising executable instructions that, when executed by one or more processors of a first wireless node, cause the first wireless node to: receive multiple configurations allocating resources for communication with one or more second wireless nodes, each of the multiple configurations being mapped to a configuration identifier; receive a message including the configuration identifier mapped to at least two of the multiple configurations, the message activating the at least two of the multiple configuration for the communication with the one or more second wireless nodes; and communicate with the one or more second wireless nodes using the at least two of the multiple configurations activated via the message.

Certain aspects provide an apparatus for wireless communication by a first wireless node. The apparatus generally includes a memory comprising executable instructions; and one or more processors configured to execute the executable instructions and cause the first wireless node to: receive multiple configurations allocating resources for communication with one or more second wireless nodes, each of the multiple configurations being mapped to a configuration identifier; receive a message including the configuration identifier mapped to at least two of the multiple configurations, the message activating the at least two of the multiple configuration for the communication with the one or more second wireless nodes; and communicate with the one or more second wireless nodes using the at least two of the multiple configurations activated via the message.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for activation of configurations, such as semi persistent scheduling (SPS) configurations or configured grants (CGs). In some scenarios, a user-equipment (UE) may receive multiple configurations for SPS and/or CG transmissions. Separate control information transmissions to the UE may be used to activate each configuration, resulting in a large amount of network control overhead. Therefore, what is needed are techniques for reducing overhead associated with activation of SPS and/or CG transmissions.

Some aspects of the present disclosure are directed to using a common activation command for multiple CG and/or SPS configurations. For example, a BS may transmit an activation command having a bitmap or codepoints indicating the multiple CG and/or SPS configurations to be activated. Based on the activation command, the UE may begin using the configured resources for the CG transmission(s) or SPS transmission(s) (or both). As an example, a codepoint may be mapped to each of the multiple SPS and/CG configurations, allowing the codepoints indicated via control information transmission to a UE to indicate which SPS and/or CG configurations are to be activated. The aspects described herein reduce network control overhead by allowing selection of SPS and/or CG configurations and activation of the same using a single control information transmission.

Introduction to Wireless Communication Networks

Figure 1:
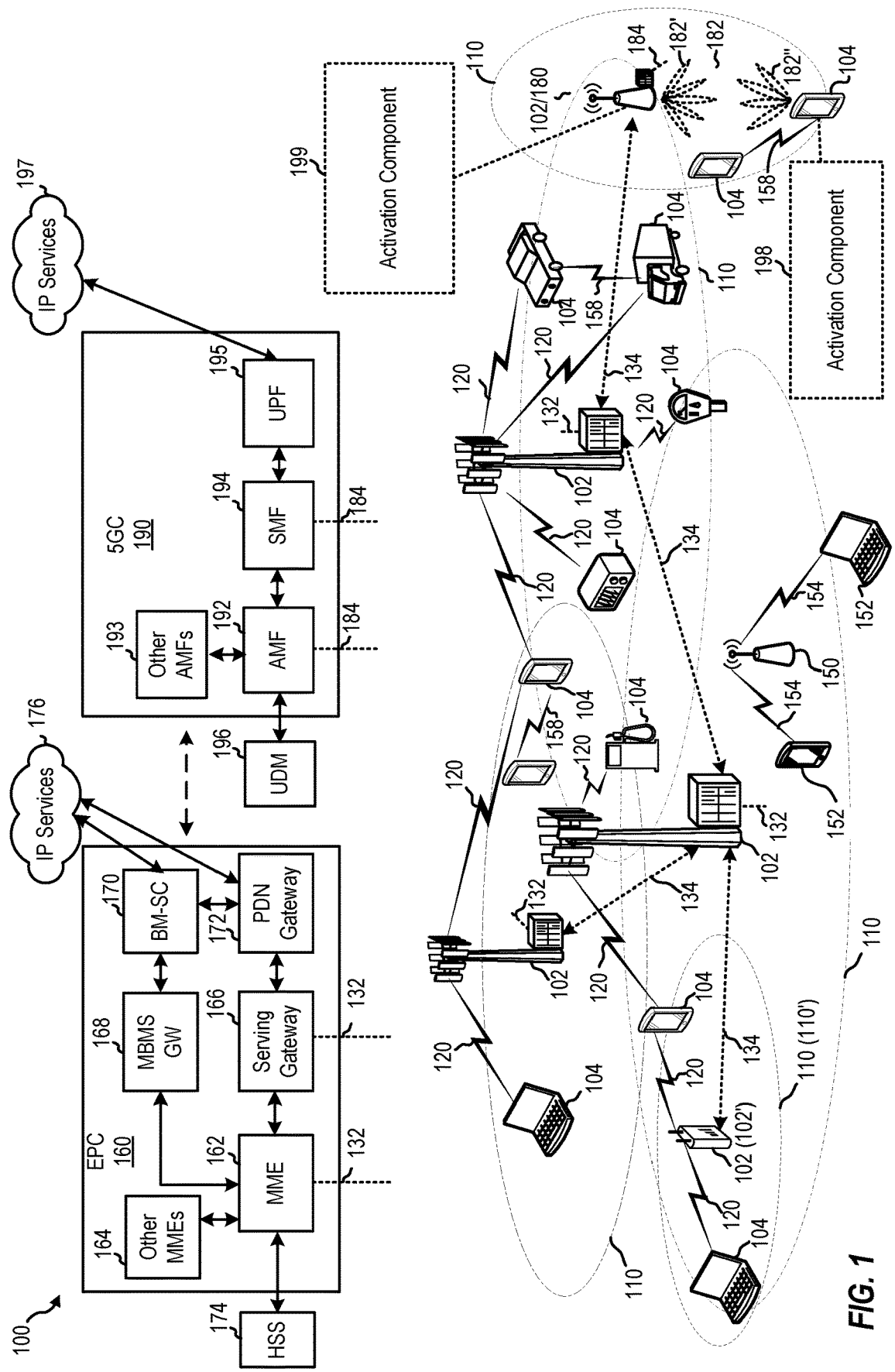
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes activation component 199, which may be configured to transmit an activation of SPS and/or CG transmissions. Wireless network 100 further includes activation component 198, which may be used configured to receive an activation of SPS and/or CG transmissions. An SPS configuration generally refers to a configuration of resources (e.g., via radio resource control (RRC) signaling) having a periodicity for uplink transmissions. In other words, once activated, the configured periodic resources may be used for data transmission on uplink until deactivated without dynamic resource allocation via downlink control information (DCI) prior o teach data transmission. On the other hand, a dynamic physical uplink shared channel (PUSCH) refers to a transmission that may be scheduled using downlink control information (DCI). Similarly, a configured grant refers to a configuration of resources (e.g., via RRC signaling) having a periodicity for downlink transmissions.

Base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Figure 2:
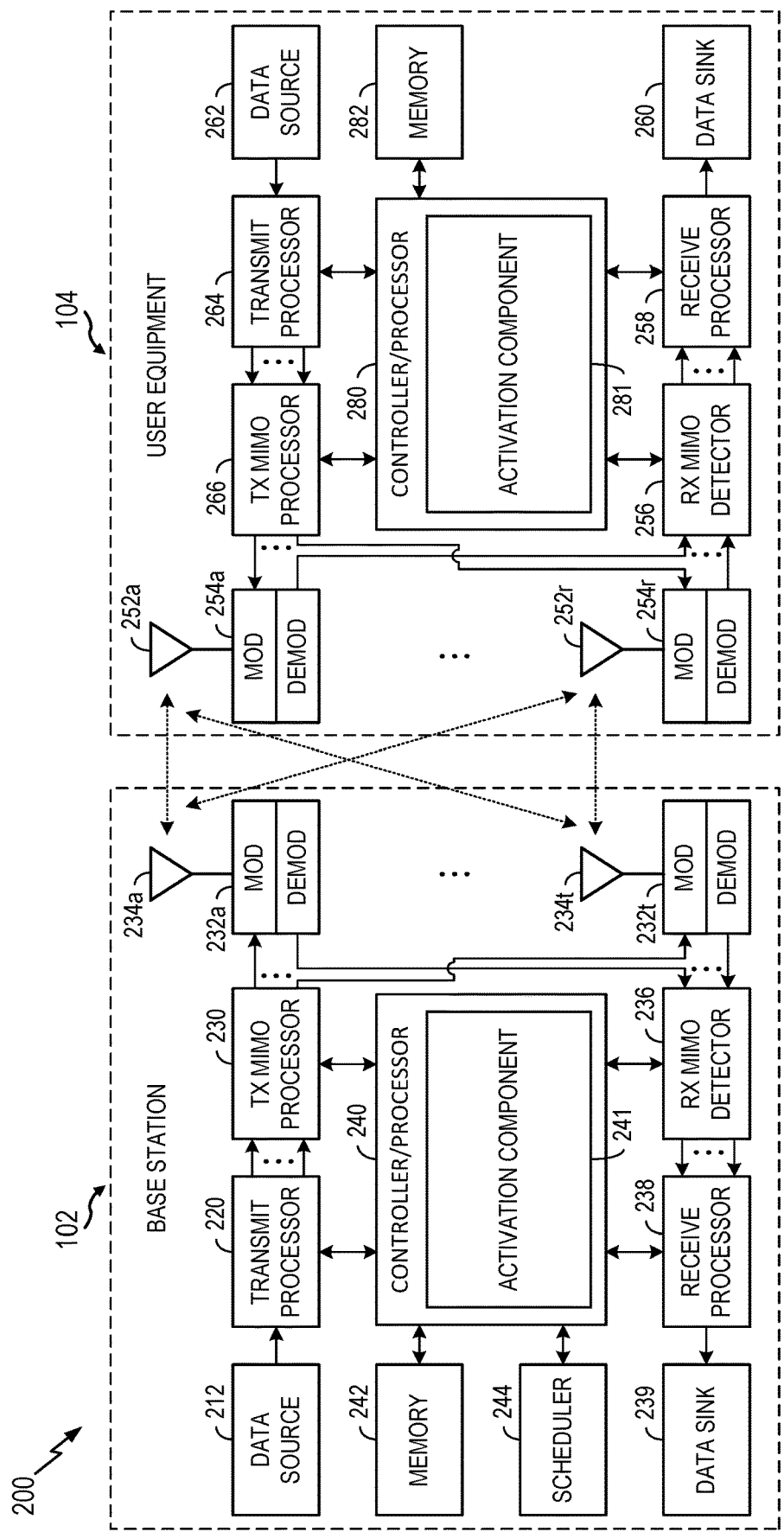
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes activation component 241, which may be representative of activation component 199 of FIG. 1. Notably, while depicted as an aspect of controller/processor 240, activation component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 102 includes controller/processor 280, which may be configured to implement various functions related to wireless communications. In the depicted example, controller/processor 280 includes activation component 281, which may be representative of activation component 198 of FIG. 1. Notably, while depicted as an aspect of controller/processor 280, activation component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example Full-Duplex Communication

Certain aspects of the present disclosure are directed to techniques for implementing full-duplex (FD) communication (also referred to herein as "FD mode"). FD communication generally refers to simultaneous transmission and reception of signals (e.g., uplink (UL) and downlink (DL) transmissions). The simultaneous UL/DL transmissions may be in FR2, as described above.

FD capability may be present at either a base station (BS), a user equipment (UE), or both. For instance, at the UE, UL may be via one antenna panel and DL reception may be via another antenna panel. Similarly, at the BS, UL may be via one antenna panel (e.g., at one transmission-reception point (TRP)) and DL reception may be via another antenna panel (e.g., at another TRP).

FD capability may be conditional on beam separation to reduce self-interference between DL and UL and clutter echo (e.g., due to objects causing reflection of signaling). FD communication facilitates latency reduction by allowing reception of DL signal in UL only slots, or UL signal in DL only slots. FD communication also provides spectrum efficiency enhancements per cell and per UE, and provides more efficient resource utilization.

Figure 4A:
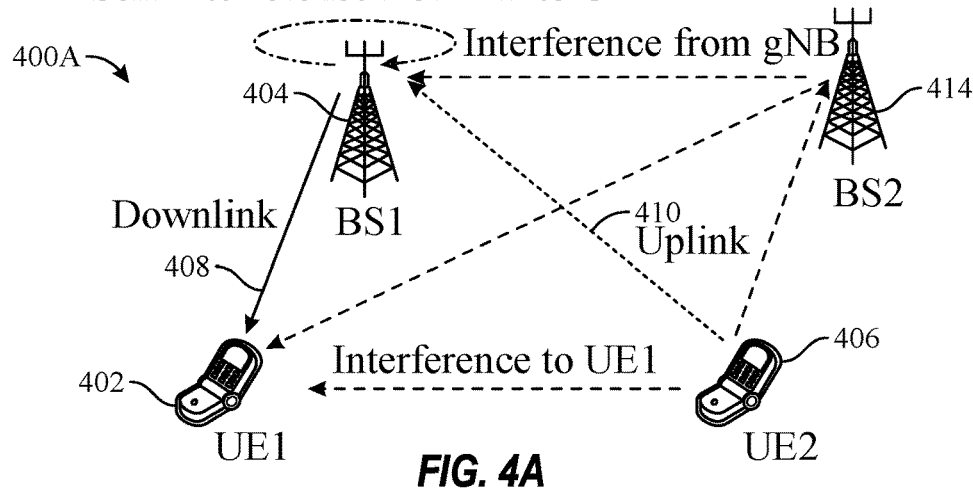
FIGS. 4A-4F are diagrams illustrating example full duplex (FD) communication deployments.
Figure 4B:
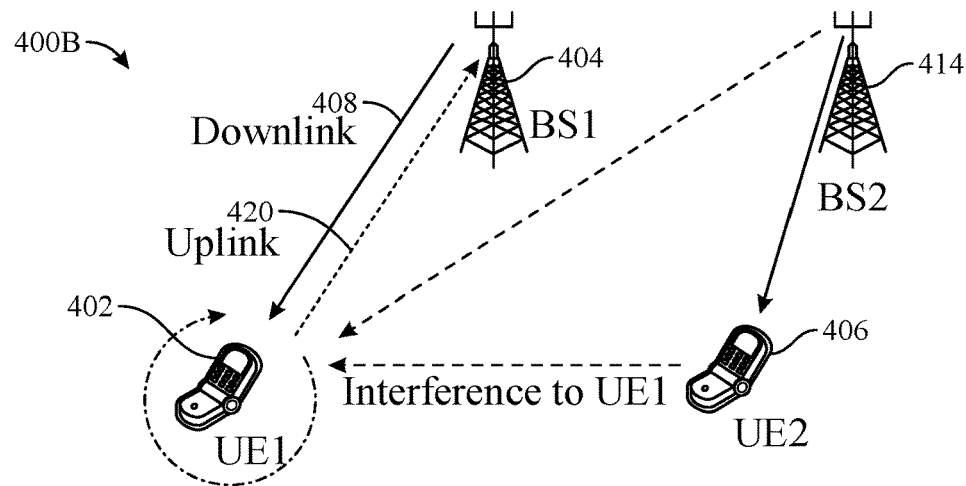
Figure 4C:
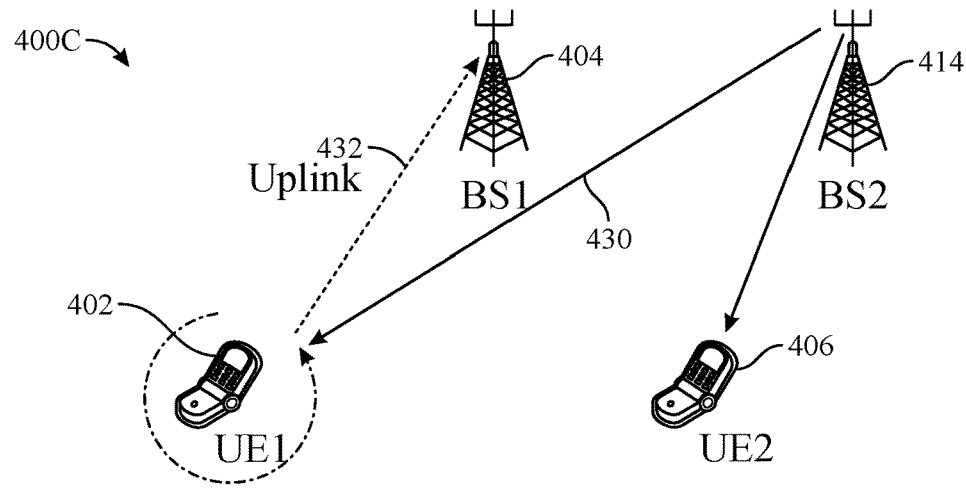

FIGS. 4A-4C are diagrams of example FD communication deployments. FIG. 4A illustrates a deployment 400A including a full-duplex (FD) BS and a half-duplex (HD) UE. As illustrated, a UE 402 (e.g., HD UE) may receive a DL transmission 408 from a BS 404 (e.g., FD BS), while another UE 406 may send an UL transmission 410 to the same BS 404. The UL transmission 410 and the DL transmission 408 may overlap in the time domain. The BS 404, operating in a FD mode, may thus experience self-interference from the DL transmission 408 to the reception by the BS of the UL transmission 410. Further, as shown, UE 402 may experience interference from UE 406 and another BS 414, and BS 404 may experience interference from BS 414.

FIG. 4B illustrates a deployment 400B including a FD BS and a FD UE. As illustrated, UE 402 may receive a DL transmission 408 from BS 404 and send an UL transmission 420 to the same BS 404. Thus, both UE 402 and BS 404 are operating in FD mode. UE 402 may thus experience self-interference from UL transmission 420 to the reception by the UE of DL transmission 408. In other words, the UL transmission 420 may cause interference and prevent proper reception and decoding of the DL transmission 408. Further, as shown, UE 402 may experience interference from UE 406 and BS 414, while UE 406 is receiving DL transmissions from the BS 414.

FIG. 4C illustrates a deployment 400C including an FD UE with multi-transmission/reception point (TRP) communication. UE 402 may receive a DL transmission 430 from BS 414 and send an UL transmission 432 to BS 404. The DL transmission and the UL transmission 432 may overlap in the time-domain. Thus, the UE 402 may be operating in FD mode. The UE 402 may thus experience self-interference from the UL transmission 432 to the reception by the UE of DL transmission 430. In other words, the UL transmission 432 may cause interference and prevent proper reception and decoding of the DL transmission 430. Further, as shown, the UE 406 may receive DL transmissions from the BS 414.

Figure 4D:
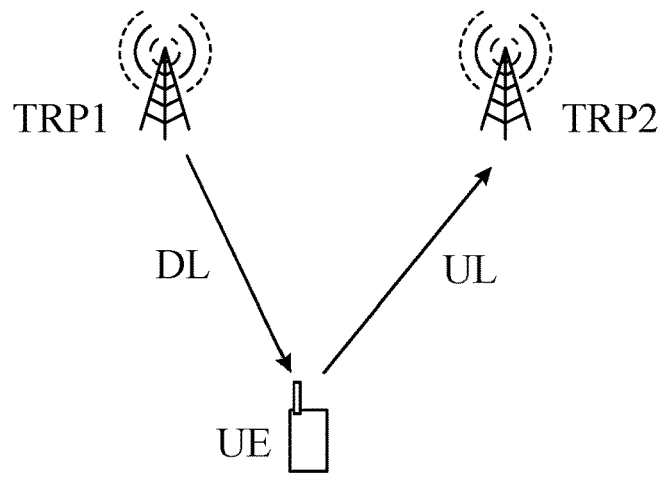
Figure 4E:
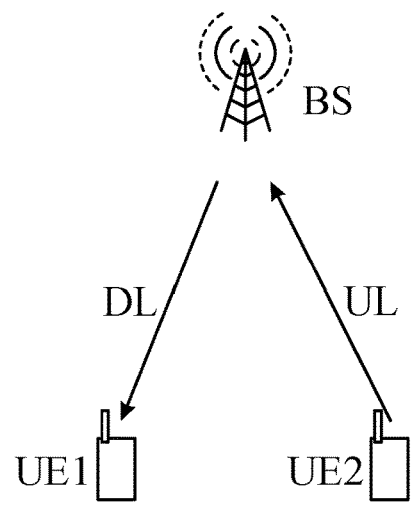
Figure 4F:
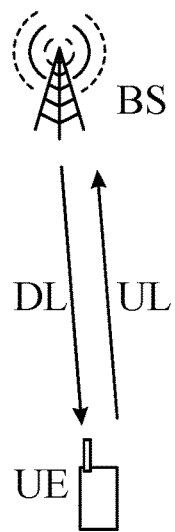

FIGS. 4D, 4E, and 4F illustrate example scenarios for communication between at least one UE and at least one base station (BS) or transmission and reception point (TRP). For example, as illustrated in FIG. 4D, a UE may be communicating using FD mode by simultaneously receiving signaling from TRP 1 on DL and transmitting signaling to TRP 2 on UL.

As illustrated in FIG. 4E, a BS may be communicating using FD. For instance, a BS may simultaneously transmit signaling to UE 1 on DL and receive signaling from UE 2 on UL.

As illustrated in FIG. 4F, both a UE and BS may be communicating using FD. For example, a BS may simultaneously transmit signaling to a UE and receive signaling from the same UE. Various techniques for communication using FD mode are described in more detail with respect to FIG. 5.

Figure 5:
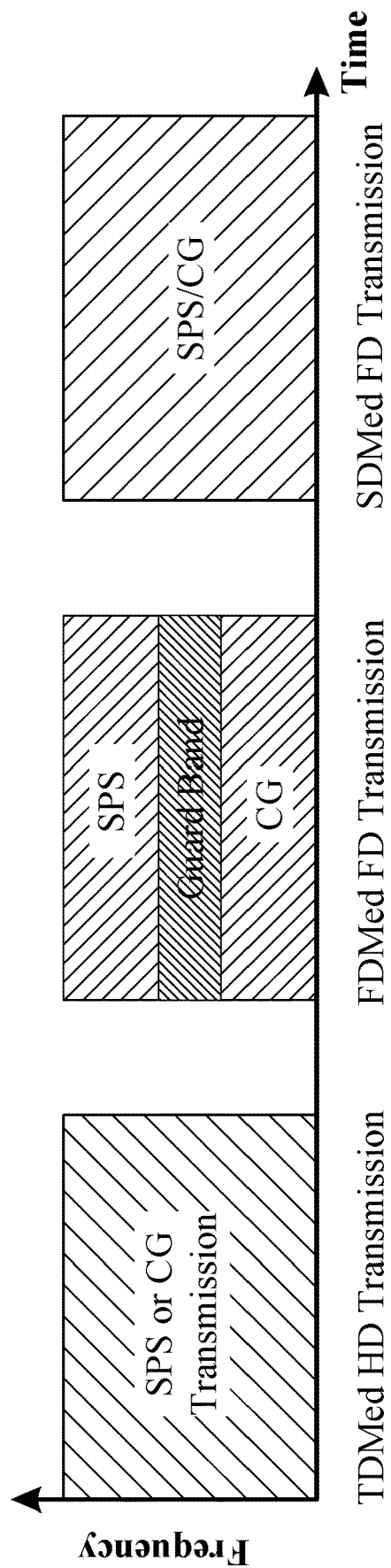
FIG. 5 illustrates half-duplex (HD), frequency division multiplexed (FDMed) FD, and spatial division multiplexed (SDMed) FD communication modes.

FIG. 5 illustrates half-duplex (HD), as well as frequency division multiplexed (FDMed) FD, and spatial division multiplexed (SDMed) FD modes.

As illustrated, when using HD mode, a first transmission (e.g., a CG transmission) cannot overlap in time with DL transmissions, such as a SPS transmission, physical downlink control channel (PDCCH), physical downlink shared channel (PDSCH), channel state information (CSI)-reference signal (RS). Transmission using HD mode may also be referred to as a time division multiplexed (TDMed) transmission. TDMed transmission may have a longer access delay as compared to using FD mode of communication. For FD mode, an UL transmission (e.g., CG transmission) may overlap in time with DL transmissions, such as an SPS transmission, PDCCH, PDSCH, etc., to enable a more efficient system and lower latency. For an FDMed transmission, the UL and DL transmissions may share the same time resources but at different or partially different frequency resources with a guard band in between the frequency resources, as shown. For an SDMed transmission, UL and DL transmissions may share the same time and frequency resources, as shown.

Introduction to Semi Persistent Scheduling (SPS)

A semi-persistent scheduling (SPS) physical downlink shared channel (PDSCH) configuration may be configured using radio resource control (RRC) signaling. In some examples, the SPS configuration is configured with a certain timing parameter, such as K1, where K1 indicates the time that the UE should report a corresponding hybrid automatic repeat request (HARD)-acknowledgment (ACK) feedback for each data channel signal for the SPS. As used herein, a data channel may refer to a physical downlink shared channel (PDSCH). The SPS configuration may also include a periodicity (p), where the periodicity is the time between two consecutive SPS occasions (also referred to herein as data channel occasions, or data channel occasions). An SPS occasion generally refers to an occasion during which one the SPS configured data channels may be transmitted. In some cases, although an SPS configuration may be active, one or more of the SPS occasions may be empty (e.g., not have a data channel transmission).

Figure 6A:
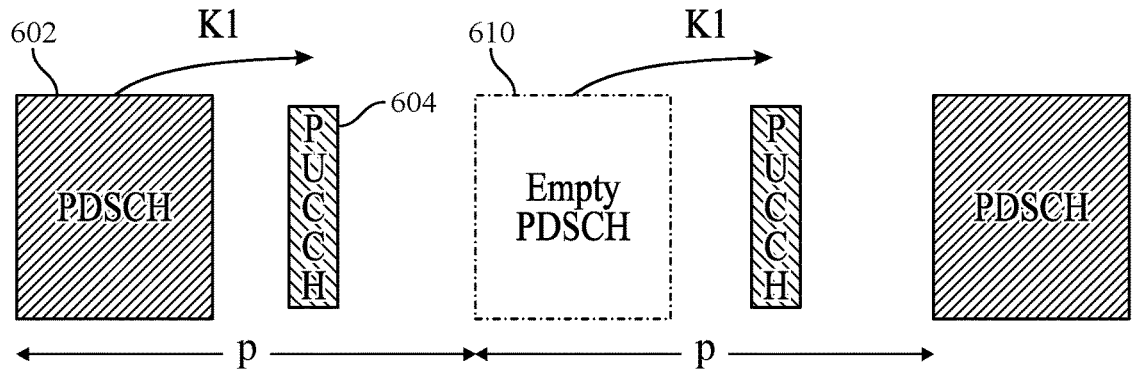
FIGS. 6A-6C illustrate example techniques for semi-persistent scheduling (SPS).
Figure 6B:
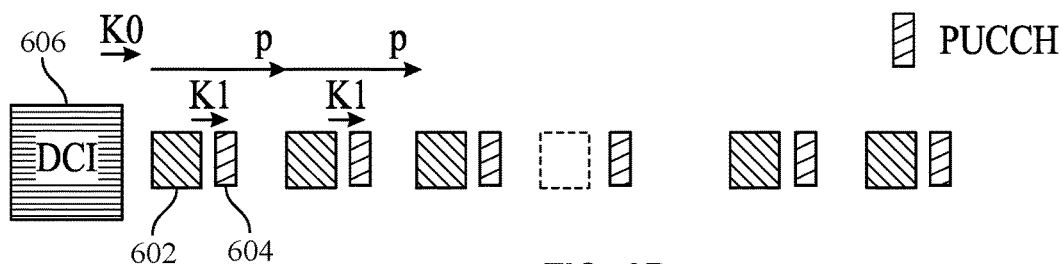
Figure 6C:
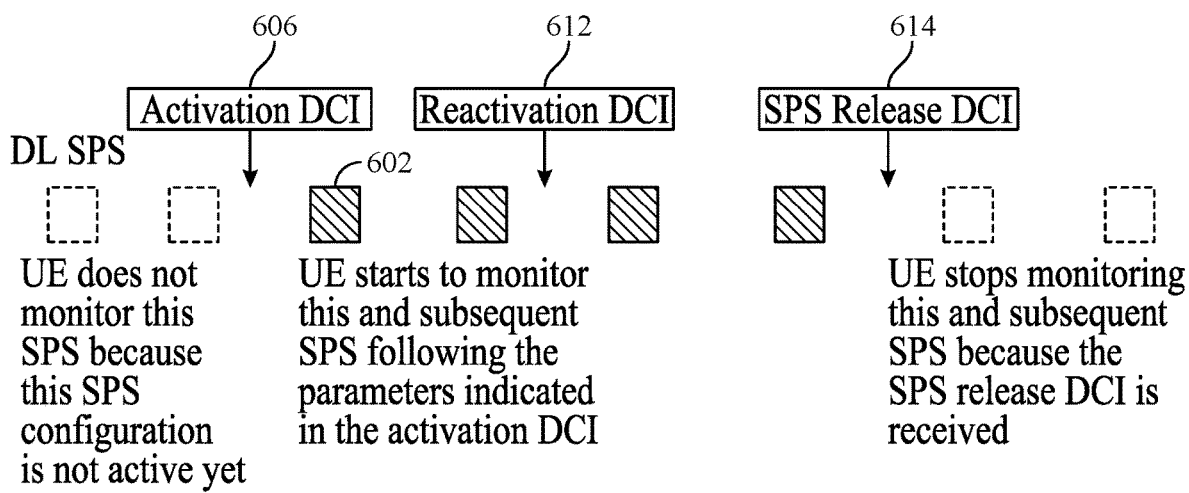

FIGS. 6A, 6B, and 6C illustrate example techniques for SPS. As described above, SPS occasions may be configured using RRC signaling. A data channel may be configured in each of the SPS occasions. For example, data channel 602 may be transmitted in an SPS occasion. The SPS occasions have a periodicity p, which represents the time between two consecutive SPS occasions (e.g., time from beginning of data channel 602 and beginning of resources 610), as shown.

RRC signaling configures the SPS periodicity (p) and HARQ-ACK feedback resources (e.g., resources for physical uplink control channel (PUCCH) 604). That is, each SPS occasion may have resources scheduled for a PUCCH. The PUCCH (e.g., PUCCH 604) may be used for acknowledgement (ACK) or negative ACK (NACK) of a corresponding data channel (e.g., data channel 602). As shown, one or more data channel transmissions during one or more SPS occasions may be skipped. For example, no data channel may be transmitted using resources 610 even though the resources 610 are configured for a data channel using SPS, as shown.

In some cases, SPS activation/reactivation downlink control information (DCI) and SPS release DCI may be used to activate or reconfigure data channel occasions. While SPS occasions may be configured via RRC signaling, DCI may be used to activate the configuration for SPS. As shown in FIG. 6B, the BS may use SPS activation DCI (e.g., DCI 606) to activate a certain configured SPS (e.g., data channel 602). In the activation DCI, the BS may indicate transmit (Tx) parameters such as modulation and coding scheme (MCS), resource block (RB) allocation, and antenna ports to be used for the SPS transmission.

As shown in FIG. 6C, prior to the activation DCI 606 being received by the UE, the UE may not monitor for a data channel. The BS may use an SPS reactivation DCI 612 to change the transmit parameters for the UE, such as MCS, RB allocation, antenna ports of the SPS. The BS may also use an SPS release DCI 614 to deactivate a configured SPS. In other words, prior to receiving the activation DCI 606, the UE may not monitor the SPS because the SPS configuration is not yet active. After the activation DCI, the UE starts to monitor for data channels following the Tx parameters in the activation DCI. After receiving the SPS release DCI, the UE stops monitoring for the data channels.

Aspects Related to Configuration Activation

Certain aspects of the present disclosure are generally directed to techniques for activating configured resources for downlink and uplink transmissions. For example, a wireless node (e.g., a user equipment (UE)) may receive an allocation for semi-persistent scheduling (SPS) for downlink and a configured grant (CG) for uplink. SPS refers to allocations of resources that may be used for uplink transmissions as described with respect to FIGS. 6A-6C. Similarly, a CG refers to allocation of resources that may be used for downlink transmissions. In other words, unlike dynamic physical downlink shared channel (PDSCH) transmissions, DL SPS resources may be allocated for SPS data transmissions that do not require a physical downlink control channel (PDCCH) transmission prior to every SPS transmission. The resource allocation may be at least partially configured using radio resource control (RRC) signaling but may be subsequently activated and deactivated using PDCCH transmissions. Similarly, allocated UL resources via CG may be used without PDCCH transmission prior to every CG transmission. For SPS or CG allocations resources allocated and beam information for corresponding DL and UL transmissions may be indicated. For one type of CG allocation, resource allocation may be fully configured and released using RRC signaling. For another type of CG allocation, resource allocation may be partially configured using RRC signaling, but may be subsequently activated and deactivated using PDCCH transmissions, as described herein. Some aspects of the present disclosure are generally directed towards techniques for activating multiple configurations using SPS or CG, or both.

Figure 7:
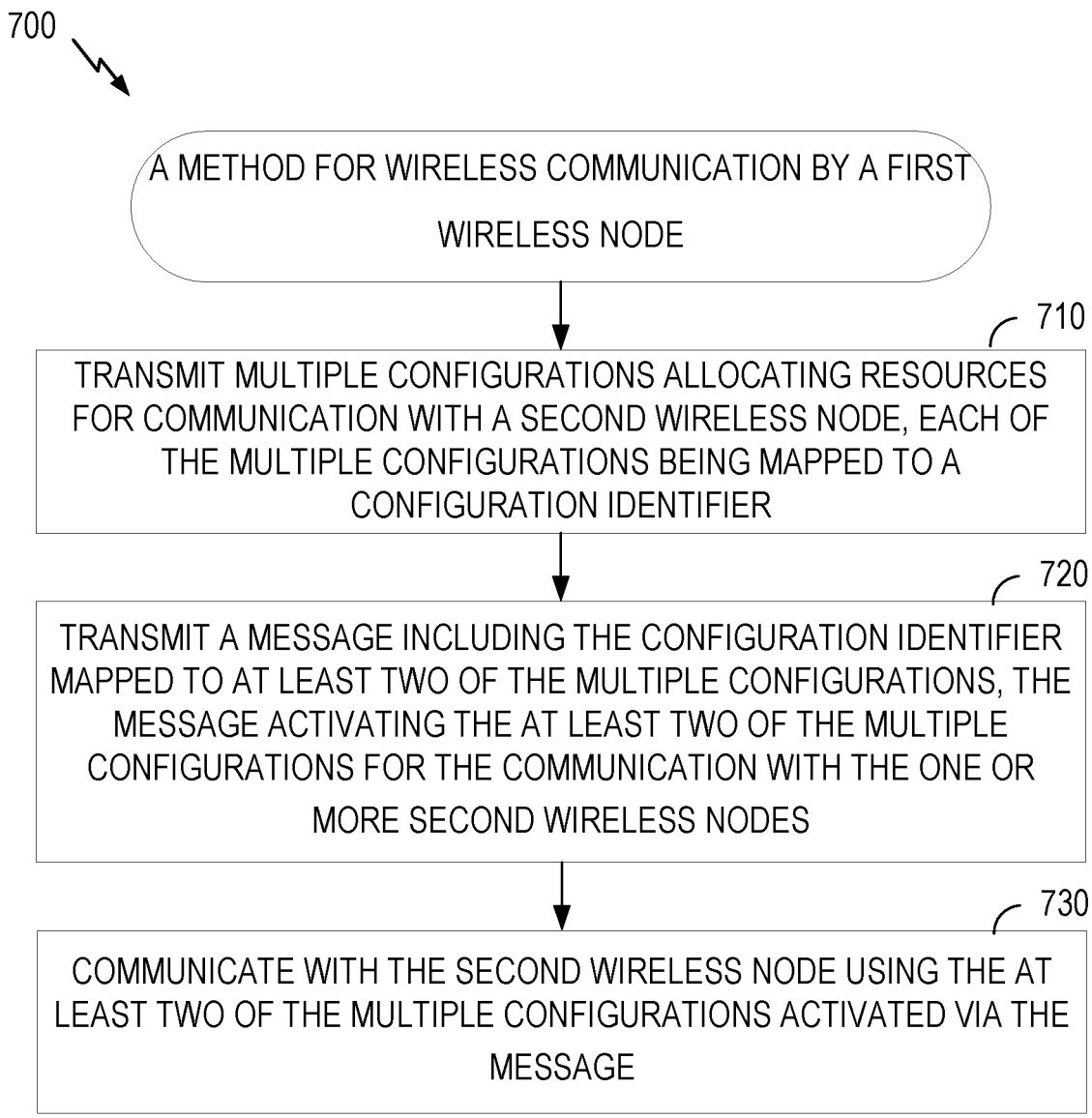
FIG. 7 is a flow diagram illustrating example operations for wireless communication by a base station (BS), in accordance with certain aspects of the present disclosure.

FIG. 7 is a flow diagram illustrating example operations 700 for wireless communication, in accordance with certain aspects of the present disclosure. The operations 700 may be performed, for example, by a first wireless node, such as a BS (e.g., such as the BS 102 in the wireless communication network 100 of FIG. 1) or any other parent node.

Operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240 or activation component 241 of FIG. 2) obtaining and/or outputting signals.

The operations 700 may begin, at block 710, by the first wireless node transmitting (e.g., via radio resource control (RRC) message) multiple configurations allocating resources for communication with a second wireless node (e.g., a UE), each of the multiple configurations being mapped to a configuration identifier. The multiple configurations may include one or more configurations for SPS transmissions on downlink, one or more configurations for CG transmissions on uplink, or any combination thereof.

At block 720, the first wireless node may transmit a message (e.g., also referred to herein as an activation command, which may be downlink control information (DCI) or an RRC message) including the configuration identifier mapped to at least two of the multiple configurations. The message may activate the at least two of the multiple configuration for the communication with the one or more second wireless nodes. The at least two of the multiple configurations may include configurations for communication during different time resources. In some cases, the at least two of the multiple configurations may include configurations for communication using time-division multiplexing, frequency-division multiplexing, or spatial-division multiplexing.

In some aspects, the configuration identifier mapped to the at least two of the multiple configurations may be a bitmap having bits mapped to the at least two of the multiple configurations. In some aspects, the configuration identifier mapped to the at least two of the multiple configurations may be codepoints mapped to the at least two of the multiple configurations. For instance, the first wireless node may transmit an indication of mapping between each of the codepoints and the configuration identifier. The indication of the mapping may be via a medium access control (MAC) control element (CE).

At block 730, the first wireless node may communicate with the second wireless node using the at least two of the multiple configurations activated via the message. In some aspects, the first wireless node may transmit DCI configuring a resource for communication on a dynamic physical downlink shared channel (PDSCH) or physical uplink shared channel (PUSCH) channel. The communication on the dynamic PDSCH or PUSCH channel may be at least partially simultaneous with the communication using the at least two of the multiple configurations. As used herein, a dynamic PDSCH or PUSCH generally refers to a data channel transmission that is scheduled using a dynamic control signal, such as DCI.

Figure 8:
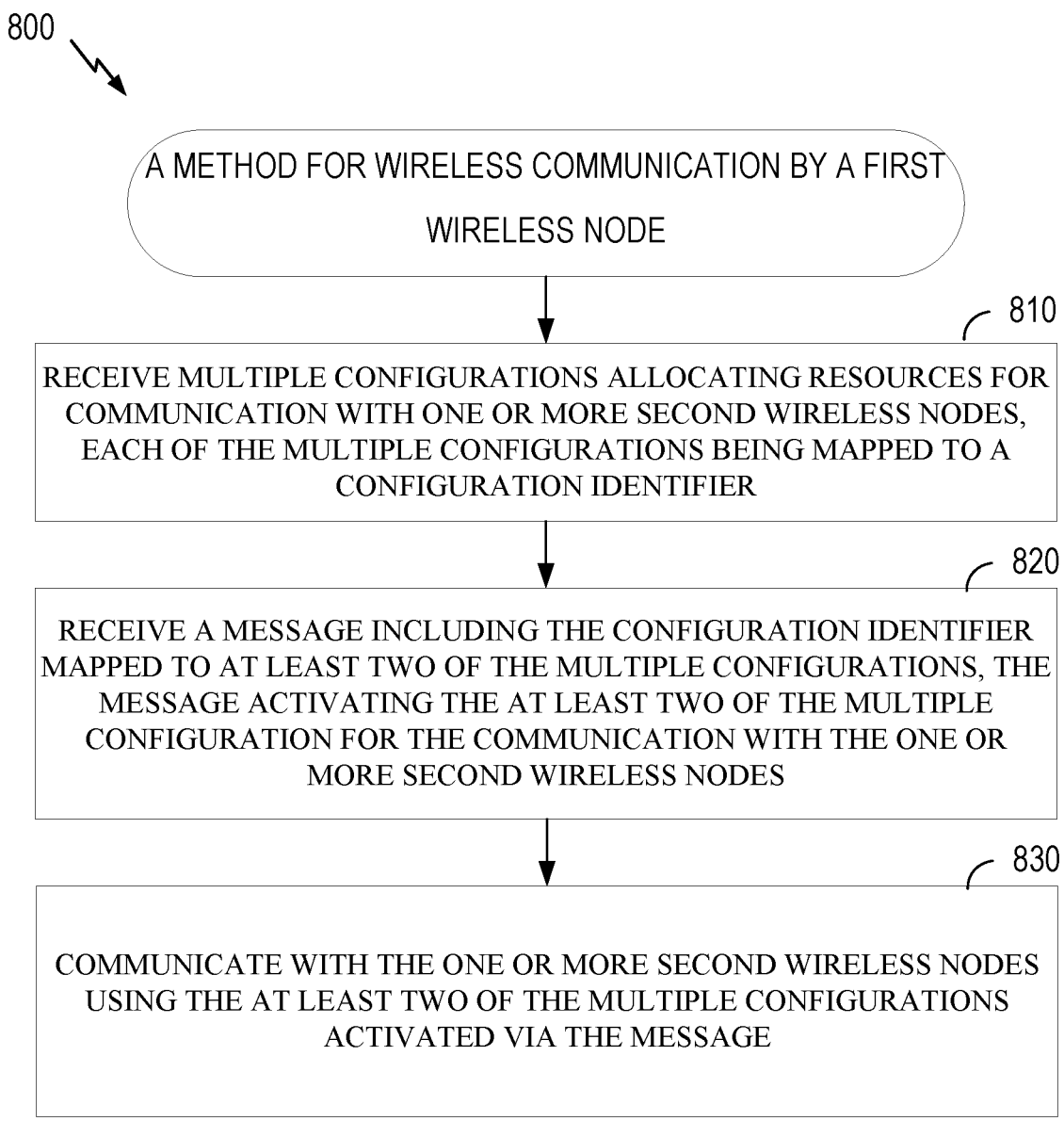
FIG. 8 is a flow diagram illustrating example operations for wireless communication by a user equipment (UE), in accordance with certain aspects of the present disclosure.

FIG. 8 is a flow diagram illustrating example operations 800 for wireless communication, in accordance with certain aspects of the present disclosure. The operations 800 may be performed, for example, by a first wireless node such as a UE (e.g., a UE 104 in the wireless communication network 100 of FIG. 1) or any other child node. A child node generally refers to any node that is managed by another node (e.g., a parent node).

The operations 800 may be complementary operations by the UE to the operations 700 performed by the BS, as described with respect to FIG. 7. Operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280 or activation component 281 of FIG. 2) obtaining and/or outputting signals.

The operations 800 may begin, at block 810, by the first wireless node receiving multiple configurations allocating resources for communication with one or more second wireless nodes (e.g., transmission-reception points (TRPs) or BSs), each of the multiple configurations being mapped to a configuration identifier. The multiple configurations may include one or more configurations for SPS transmissions on downlink, one or more configurations for CG transmissions on uplink, or any combination thereof.

At block 820, the first wireless node may receive a message including the configuration identifier mapped to at least two of the multiple configurations, the message activating the at least two of the multiple configuration for the communication with the one or more second wireless nodes. The at least two of the multiple configurations may include configurations for communication during different time resources. In some cases, the at least two of the multiple configurations may include configurations for communication using time-division multiplexing, frequency-division multiplexing, or spatial-division multiplexing (e.g., as described with respect to FIG. 5).

In some aspects, the configuration identifier mapped to the at least two of the multiple configurations may be a bitmap having bits mapped to the at least two of the multiple configurations. In some aspects, the configuration identifier mapped to the at least two of the multiple configurations may be codepoints mapped to the at least two of the multiple configurations. For instance, the first wireless node may receive an indication of mapping between each of the codepoints and the configuration identifier. The indication of the mapping may be via a MAC-CE.

At block 830, the first wireless node may communicate with the one or more second wireless nodes using the at least two of the multiple configurations activated via the message. The first wireless node may receive DCI configuring a resource for communication on a dynamic PDSCH or PUSCH channel in some aspects. The communication on the dynamic PDSCH or PUSCH channel may be at least partially simultaneous with the communication using the at least two of the multiple configurations.

Figure 9A:
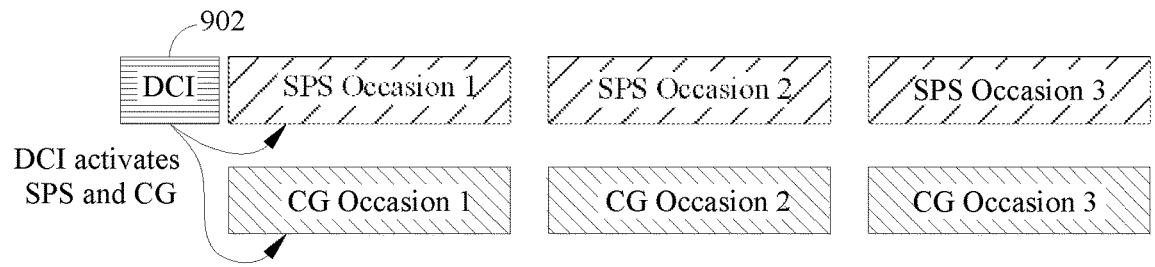
FIGS. 9A-9C illustrate example activation messages, in accordance with certain aspects of the present disclosure.
Figure 9B:
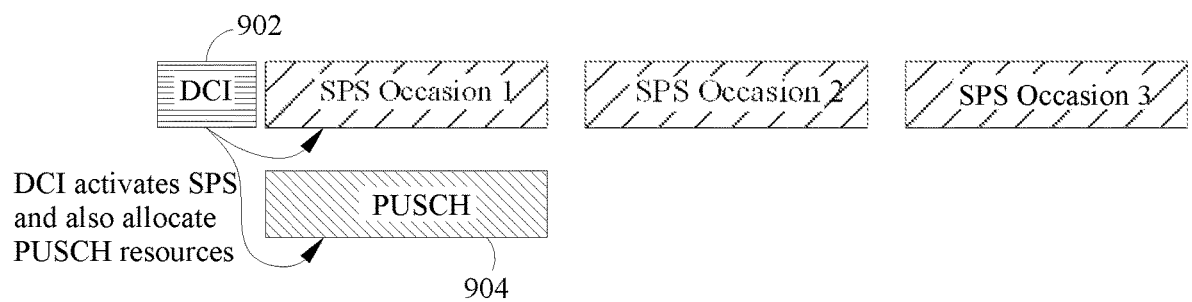
Figure 9C:
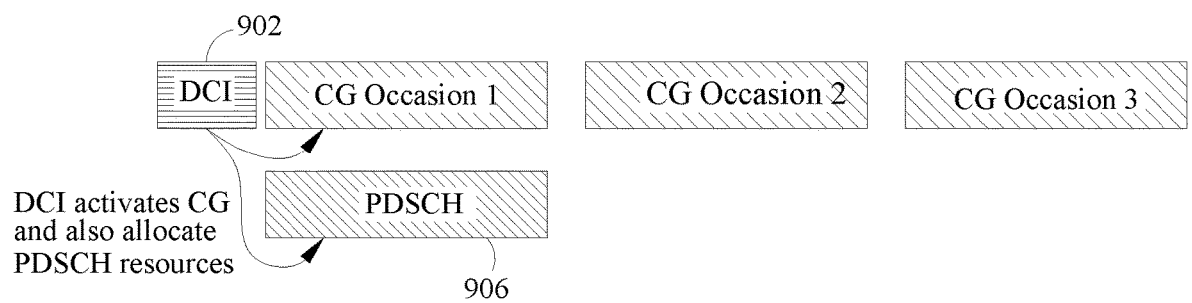

FIGS. 9A-9C illustrate an activation command 902 (e.g., DCI in this example), in accordance with certain aspects of the present disclosure.

As shown in FIG. 9A, the activation command 902 may be used to activate SPS and CG occasions. Activation command 902 may activate a configuration for SPS transmissions and a configuration for CG transmissions. For example, once activated via activation command 902, transmissions may occur during SPS occasions 1-3 and CG occasions 1-3.

As shown in FIG. 9B, activation command 902 may activate SPS transmissions for downlink, as well as serve as control information scheduling a dynamic PUSCH 904. The PUSCH 904 may be transmitted simultaneously with the SPS transmission during SPS occasion 1 using FD mode.

Similarly, as shown in FIG. 9C, activation command 902 may activate CG transmissions (e.g., CG occasions 1-3) for uplink, and also schedule a dynamic PDSCH 906. The PDSCH 906 may be transmitted simultaneously with the CG transmission during CG occasion 1 using FD mode.

Figure 10:
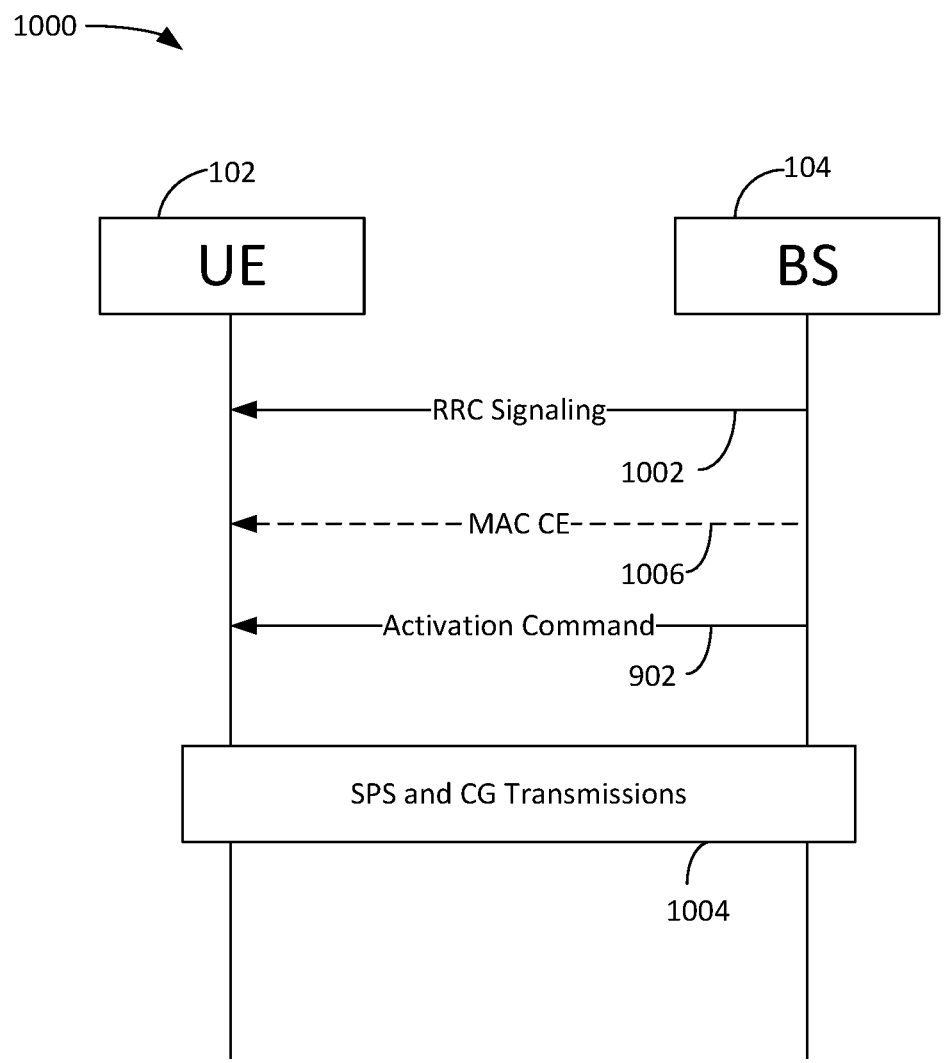
FIG. 10 is a call flow diagram illustrating example operations for activation of semi-persistent scheduling (SPS) or configured grant (CG) transmissions, in accordance with certain aspects of the present disclosure.

FIG. 10 is a call flow diagram illustrating example operations 1000 for activation of SPS or CG transmissions, in accordance with certain aspects of the present disclosure.

For scheduling SPS and CG, or SPS and PUSCH, or CG and PDSCH transmissions for FD mode, one or multiple SPS and/or CG configurations may be activated. For example, resources for one or more configuration for SPS transmissions, one or more configurations for CG transmissions, or both, may be configured via RRC signaling 1002 transmitted from the BS 102 to the UE 104. For example, the RRC signaling 1002 may indicate a first configuration for SPS transmissions, a second configuration for SPS transmissions, a third configuration for CG transmissions, and a fourth configuration for CG transmissions. Any combination of the first, second, third, and fourth configurations may be activated via an activation command 902. The activation command 902 may be DCI, in some cases.

In some aspects, the activation command 902 may include a bitmap as a configuration identifier to indicate which configurations are active. As an example, the first configuration for SPS transmissions may be associated with a configuration ID 0, the second configuration for SPS transmissions may be associated with a configuration ID 1, the third configuration for CG transmissions may be associated with a configuration ID 2, the fourth configuration for CG transmissions may be associated with a configuration ID 3. A bitmap indicating 1010 may indicate that configuration IDs 0 and 2 are active. Thus, at block 1004, the UE may begin transmitting during SPS and CG occasions associated with configuration IDs 0 and 2 (e.g., first configuration for SPS transmissions and third configuration for CG transmissions). The SPS and CG transmissions may be time division duplexed, frequency division duplexed, or spatial division duplexed.

In some aspects, the activation command 902 may indicate one or more configurations to be activated by mapping of one or more codepoints to one or more configuration IDs. For example, codepoint 00 and 01 may be mapped to configuration IDs 0 and 2, respectively. Activation command 902 may include codepoints 00 and 01 as a configuration identifier to activate the configurations associated with configuration IDs 0 and 2. In some aspects, the mapping between each codepoint and a configuration ID may be indicated to the UE using a MAC-CE 1006.

The aspects described herein may be implemented for various types of CGs. For example, for type 1 CG, RRC (e.g., RRC signaling 1002) may be used to provide the configured uplink grant (e.g., including the periodicity of the CG transmissions). As another example, for type 2 CG, RRC defines the periodicity of the configured uplink grant while PDCCH (e.g., DCI) activates (or deactivates) the configured uplink grant, or deactivates the configured uplink grant. In some aspects, the activation for the configurations (e.g., via activation command 902) as described may be via DCI for SPS configurations and type 2 CG, or via RRC, for type 1 CG. For instance, the RRC signaling 1002 may be used to activate a type 1 CG.

As described herein, the configurations SPS transmissions and the configurations for CG transmissions may be time-division multiplexed (TDMed) (e.g., using half duplex (HD) mode), but activated by the same DCI or RRC signaling instead of by separate DCI or RRC signaling. In other words, multiple configurations (e.g., configuration ID 0 and configuration ID 2) may be activated using the same activation command, such as the activation command 902, and activated configurations may be used for communication using HD mode. In some aspects, the SPSs and CGs could be FDMed or SDMed (e.g., using FD mode), as described.

Example Wireless Communication Devices

Figure 11:
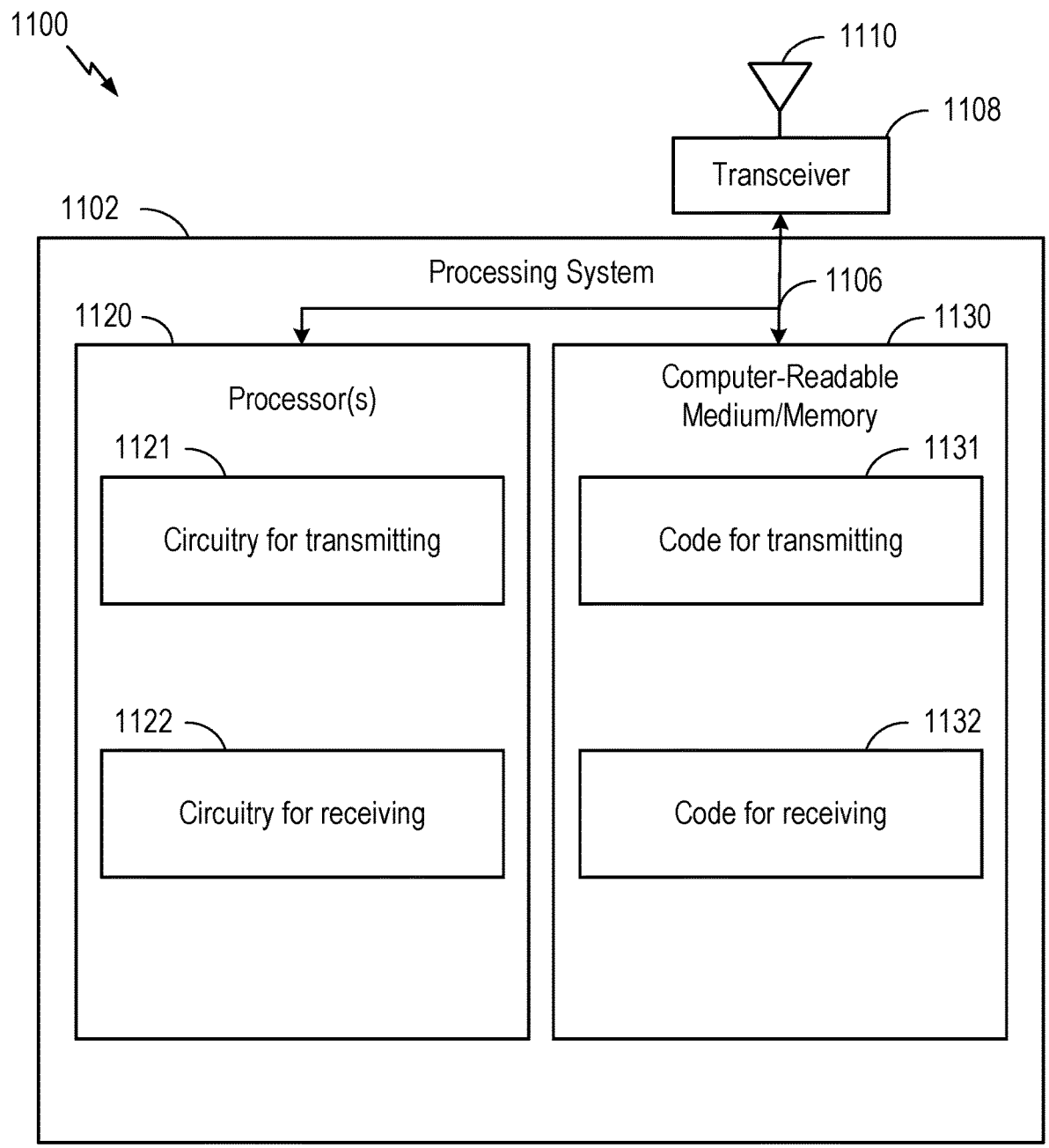
FIG. 11 depicts aspects of an example communications device.

FIG. 11 depicts an example communications device 1100 that includes various components operable, configured, or adapted to perform operations for the techniques disclosed herein, such as the operations depicted and described with respect to FIGS. 7, 9A-C and 10. In some examples, communication device 1100 may be a base station 102 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIGS. 7, 9A-C and 10, or other operations for performing the various techniques discussed herein for transmitting an activation of SPS and/or CG transmissions.

In the depicted example, computer-readable medium/memory 1130 stores code 1131 for transmitting and code 1132 for receiving.

In the depicted example, the one or more processors 1120 (or activation component 241) include circuitry configured to implement the code stored in the computer-readable medium/memory 1130, including circuitry 1121 for transmitting and circuitry 1122 for receiving.

Various components of communications device 1100 may provide means for performing the methods described herein, including with respect to FIGS. 7, 9A-C and 10.

In some examples, means for transmitting or sending (or means for outputting for transmission) may include the transceivers 232 and/or antenna(s) 234 of the base station 102 illustrated in FIG. 2 and/or transceiver 1108 and antenna 1110 of the communication device 1100 in FIG. 11.

In some examples, means for receiving (or means for obtaining) may include the transceivers 232 and/or antenna(s) 234 of the base station illustrated in FIG. 2 and/or transceiver 1108 and antenna 1110 of the communication device 1100 in FIG. 11.

In some examples, means for transmitting and means for communicating may include various processing system components, such as: the one or more processors 1120 in FIG. 11, or aspects of the base station 102 depicted in FIG. 2, including receive processor 238, transmit processor 220, TX MIMO processor 230, and/or controller/processor 240 (including activation component 241).

Notably, FIG. 11 is just use example, and many other examples and configurations of communication device 1100 are possible.

Figure 12:
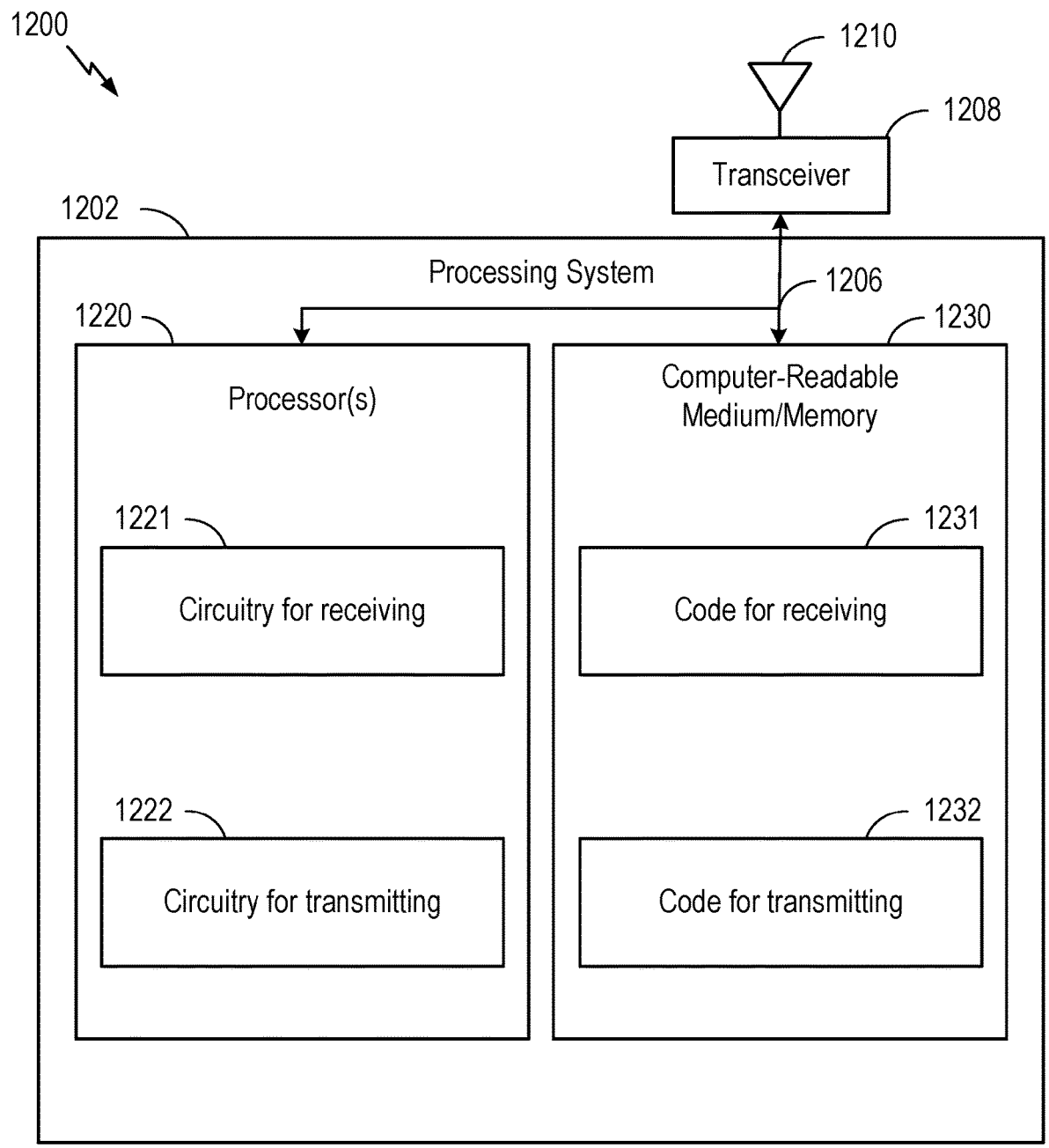
FIG. 12 depicts aspects of another example communications device.

FIG. 12 depicts an example communications device 1200 that includes various components operable, configured, or adapted to perform operations for the techniques disclosed herein, such as the operations depicted and described with respect to FIGS. 8, 9A-C, and 10. In some examples, communication device 1200 may be a user equipment 104 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIGS. 8, 9A-C, and 10, or other operations for performing the various techniques discussed herein for receiving an activation of SPS and/or CG transmissions.

In the depicted example, computer-readable medium/memory 1230 stores code 1231 for receiving and code 1232 for transmitting.

In the depicted example, the one or more processors 1220 (or activation component 281) include circuitry configured to implement the code stored in the computer-readable medium/memory 1230, including circuitry 1221 for receiving and circuitry 1222 for transmitting.

Various components of communications device 1200 may provide means for performing the methods described herein, including with respect to FIGS. 8, 9A-C, and 10.

In some examples, means for transmitting or sending (or means for outputting for transmission) may include the transceivers 254 and/or antenna(s) 252 of the user equipment 104 illustrated in FIG. 2 and/or transceiver 1208 and antenna 1210 of the communication device 1200 in FIG. 12.

In some examples, means for receiving (or means for obtaining) may include the transceivers 254 and/or antenna(s) 252 of the user equipment 104 illustrated in FIG. 2 and/or transceiver 1208 and antenna 1210 of the communication device 1200 in FIG. 12.

In some examples, means for receiving and means for transmitting may include various processing system components, such as: the one or more processors 1220 in FIG. 12, or aspects of the user equipment 104 depicted in FIG. 2, including receive processor 258, transmit processor 264, TX MIMO processor 266, and/or controller/processor 280 (including activation component 281).

Notably, FIG. 12 is just use example, and many other examples and configurations of communication device 1200 are possible.

Example Clauses

Implementation examples are described in the following numbered clauses:

Clause 1. A method for wireless communication by a first wireless node, comprising: receiving multiple configurations allocating resources for communication with one or more second wireless nodes, each of the multiple configurations being mapped to a configuration identifier; receiving a message including the configuration identifier mapped to at least two of the multiple configurations, the message activating the at least two of the multiple configuration for the communication with the one or more second wireless nodes; and communicating with the one or more second wireless nodes using the at least two of the multiple configurations activated via the message.

Clause 2. The method of clause 1, wherein the multiple configurations comprise: one or more configurations for semi-persistent scheduling (SPS) transmissions on downlink; one or more configurations for configured grant (CG) transmissions on uplink; or any combination thereof.

Clause 3. The method of any one of clauses 1-2, wherein the configuration identifier mapped to the at least two of the multiple configurations comprises a bitmap having bits mapped to the at least two of the multiple configurations.

Clause 4. The method of any one of clauses 1-3, wherein the configuration identifier mapped to the at least two of the multiple configurations comprises codepoints mapped to the at least two of the multiple configurations.

Clause 5. The method of clause 4, further comprising receiving an indication of mapping between each of the codepoints and the configuration identifier.

Clause 6. The method of clause 5, wherein the indication of the mapping is received via a medium access control (MAC) control element (CE).

Clause 7. The method of any one of clauses 1-6, wherein the message comprises downlink control information (DCI).

Clause 8. The method of any one of clauses 1-7, wherein the message comprises a radio resource control (RRC) message.

Clause 9. The method of any one of clauses 1-8, wherein the multiple configurations are received via at least one RRC message, and wherein the at least two of the multiple configurations are activated via DCI.

Clause 10. The method of any one of clauses 1-9, further comprising receiving downlink control information (DCI) configuring a resource for communication on a dynamic physical downlink shared channel (PDSCH) or physical uplink shared channel (PUSCH) channel, the communication on the dynamic PDSCH or PUSCH channel being at least partially simultaneous with the communication using the at least two of the multiple configurations.

Clause 11. The method of any one of clauses 1-10, wherein the at least two of the multiple configurations comprises configurations for communication during different time resources.

Clause 12. The method of any one of clauses 1-11, wherein the at least two of the multiple configurations comprises configurations for communication using time-division multiplexing, frequency-division multiplexing, or spatial-division multiplexing.

Clause 13. A method for wireless communication by a first wireless node, comprising: transmitting multiple configurations allocating resources for communication with a second wireless node, each of the multiple configurations being mapped to a configuration identifier; transmitting a message including the configuration identifier mapped to at least two of the multiple configurations, the message activating the at least two of the multiple configuration for the communication with the one or more second wireless nodes; and communicating with the second wireless node using the at least two of the multiple configurations activated via the message.

Clause 14. The method of clause 13, wherein the multiple configurations comprise: one or more configurations for semi-persistent scheduling (SPS) transmissions on downlink; one or more configurations for configured grant (CG) transmissions on uplink; or any combination thereof.

Clause 15. The method of any one of clauses 13-14, wherein the configuration identifier mapped to the at least two of the multiple configurations comprises a bitmap having bits mapped to the at least two of the multiple configurations.

Clause 16. The method of any one of clauses 13-15, wherein the configuration identifier mapped to the at least two of the multiple configurations comprises codepoints mapped to the at least two of the multiple configurations.

Clause 17. The method of clause 16, further comprising transmitting an indication of mapping between each of the codepoints and the configuration identifier.

Clause 18. The method of clause 17, wherein the indication of the mapping is via a medium access control (MAC) control element (CE).

Clause 19. The method of any one of clauses 13-18, wherein the message comprises downlink control information (DCI).

Clause 20. The method of any one of clauses 13-19, wherein the message comprises a radio resource control (RRC) message.

Clause 21. The method of any one of clauses 13-20, wherein the multiple configurations are received via at least one RRC message, and wherein the at least two of the multiple configurations are activated via DCI.

Clause 22. The method of any one of clauses 13-21, further comprising transmitting downlink control information (DCI) configuring a resource for communication on a dynamic physical downlink shared channel (PDSCH) or physical uplink shared channel (PUSCH) channel, the communication on the dynamic PDSCH or PUSCH channel being at least partially simultaneous with the communication using the at least two of the multiple configurations.

Clause 23. The method of any one of clauses 13-22, wherein the at least two of the multiple configurations comprises configurations for communication during different time resources.

Clause 24. The method of any one of clauses 13-23, wherein the at least two of the multiple configurations comprises configurations for communication using time-division multiplexing, frequency-division multiplexing, or spatial-division multiplexing.

Clause 25: An apparatus, comprising: a memory comprising executable instructions; one or more processors configured to execute the executable instructions and cause the apparatus to perform a method in accordance with any one of Clauses 1-24.

Clause 26: An apparatus, comprising means for performing a method in accordance with any one of Clauses 1-24.

Clause 27: A non-transitory computer-readable medium comprising executable instructions that, when executed by one or more processors of an apparatus, cause the apparatus to perform a method in accordance with any one of Clauses 1-24.

Clause 28: A computer program product embodied on a computer-readable storage medium comprising code for performing a method in accordance with any one of Clauses 1-24.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of activation of configurations in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a first wireless node, comprising:
   receiving multiple configurations allocating resources for communication with one or more second wireless nodes, each of the multiple configurations being mapped to a configuration identifier;
   receiving a message including the configuration identifier mapped to at least two of the multiple configurations, the message activating the at least two of the multiple configurations for the communication with the one or more second wireless nodes, wherein the configuration identifier mapped to the at least two of the multiple configurations comprises a bitmap having bits mapped to the at least two of the multiple configurations; and
   communicating with the one or more second wireless nodes using the at least two of the multiple configurations activated via the message.

2. The method of claim 1, wherein the multiple configurations comprise:

one or more configurations for semi-persistent scheduling (SPS) transmissions on downlink;
one or more configurations for configured grant (CG) transmissions on uplink; or
any combination thereof.

3. The method of claim 1, wherein the message comprises downlink control information (DCI).

4. The method of claim 1, wherein the message comprises a radio resource control (RRC) message.

5. The method of claim 1, wherein the multiple configurations are received via at least one RRC message, and wherein the at least two of the multiple configurations are activated via DCI.

6. The method of claim 1, further comprising receiving downlink control information (DCI) configuring a resource for communication on a dynamic physical downlink shared channel (PDSCH) or physical uplink shared channel (PUSCH) channel, the communication on the dynamic PDSCH or PUSCH channel being at least partially simultaneous with the communication using the at least two of the multiple configurations.

7. The method of claim 1, wherein the at least two of the multiple configurations comprise configurations for communication during different time resources.

8. The method of claim 1, wherein the at least two of the multiple configurations comprise configurations for communication using time-division multiplexing, frequency-division multiplexing, or spatial-division multiplexing.

9. A method for wireless communication by a first wireless node, comprising:
transmitting multiple configurations allocating resources for communication with a second wireless node, each of the multiple configurations being mapped to a configuration identifier;
transmitting a message including the configuration identifier mapped to at least two of the multiple configurations, the message activating the at least two of the multiple configurations for the communication with the second wireless node, wherein the configuration identifier mapped to the at least two of the multiple configurations comprises a bitmap having bits mapped to the at least two of the multiple configurations; and
communicating with the second wireless node using the at least two of the multiple configurations activated via the message.

10. The method of claim 9, wherein the multiple configurations comprise:
one or more configurations for semi-persistent scheduling (SPS) transmissions on downlink;
one or more configurations for configured grant (CG) transmissions on uplink; or
any combination thereof.

11. The method of claim 9, wherein the message comprises downlink control information (DCI).

12. The method of claim 9, wherein the message comprises a radio resource control (RRC) message.

13. The method of claim 9, wherein the multiple configurations are received via at least one RRC message, and wherein the at least two of the multiple configurations are activated via DCI.

14. The method of claim 9, further comprising transmitting downlink control information (DCI) configuring a resource for communication on a dynamic physical downlink shared channel (PDSCH) or physical uplink shared channel (PUSCH) channel, the communication on the dynamic PDSCH or PUSCH channel being at least partially simultaneous with the communication using the at least two of the multiple configurations.

15. The method of claim 9, wherein the at least two of the multiple configurations comprise configurations for communication during different time resources.

16. The method of claim 9, wherein the at least two of the multiple configurations comprise configurations for communication using time-division multiplexing, frequency-division multiplexing, or spatial-division multiplexing.

17. A non-transitory computer-readable medium comprising executable instructions that, when executed by one or more processors of a first wireless node, cause the first wireless node to:
receive multiple configurations allocating resources for communication with one or more second wireless nodes, each of the multiple configurations being mapped to a configuration identifier;
receive a message including the configuration identifier mapped to at least two of the multiple configurations, the message activating the at least two of the multiple configurations for the communication with the one or more second wireless nodes, wherein the configuration identifier mapped to the at least two of the multiple configurations comprises a bitmap having bits mapped to the at least two of the multiple configurations; and
communicate with the one or more second wireless nodes using the at least two of the multiple configurations activated via the message.

18. The non-transitory computer-readable medium of claim 17, wherein the multiple configurations comprise:
one or more configurations for semi-persistent scheduling (SPS) transmissions on downlink;
one or more configurations for configured grant (CG) transmissions on uplink; or
any combination thereof.

19. The non-transitory computer-readable medium of claim 17, wherein the multiple configurations comprise:
one or more configurations for semi-persistent scheduling (SPS) transmissions on downlink;
one or more configurations for configured grant (CG) transmissions on uplink; or
any combination thereof.

20. The non-transitory computer-readable medium of claim 17, wherein the message comprises downlink control information (DCI).

21. The non-transitory computer-readable medium of claim 17, wherein the message comprises a radio resource control (RRC) message.

22. The non-transitory computer-readable medium of claim 17, wherein the multiple configurations are received via at least one RRC message, and wherein the at least two of the multiple configurations are activated via DCI.

23. The non-transitory computer-readable medium of claim 17, wherein the at least two of the multiple configurations comprise configurations for communication during different time resources.

24. The non-transitory computer-readable medium of claim 17, wherein the at least two of the multiple configurations comprise configurations for communication using time-division multiplexing, frequency-division multiplexing, or spatial-division multiplexing.

25. An apparatus for wireless communication by a first wireless node, comprising:
a memory comprising executable instructions; and
one or more processors configured to execute the executable instructions and cause the first wireless node to:

receive multiple configurations allocating resources for communication with one or more second wireless nodes, each of the multiple configurations being mapped to a configuration identifier;

receive a message including the configuration identifier mapped to at least two of the multiple configurations, the message activating the at least two of the multiple configurations for the communication with the one or more second wireless nodes wherein the configuration identifier mapped to the at least two of the multiple configurations comprises a bitmap having bits mapped to the at least two of the multiple configurations; and communicate with the one or more second wireless nodes using the at least two of the multiple configurations activated via the message.

26. The apparatus of claim 25, wherein the multiple configurations comprise:

one or more configurations for semi-persistent scheduling (SPS) transmissions on downlink;

one or more configurations for configured grant (CG) transmissions on uplink; or any combination thereof.

27. The apparatus of claim 25, wherein the message comprises downlink control information (DCI).

28. The apparatus of claim 25, wherein the message comprises a radio resource control (RRC) message.

29. The apparatus of claim 25, wherein the multiple configurations are received via at least one RRC message, and wherein the at least two of the multiple configurations are activated via DCI.

30. The apparatus of claim 25, wherein the at least two of the multiple configurations comprise configurations for communication during different time resources.

* * * * *